United States Patent
Schena (12)

(10) Patent No.: US 11,992,379 B1
(45) Date of Patent: May 28, 2024

(54) ORAL HEALTH DEVICE HAVING A HANDLE WITH A MANIFOLD SWITCHING MECHANISM

(71) Applicant: Fresh Health Inc., Mountain View, CA (US)

(72) Inventor: Bruce Michael Schena, Menlo Park, CA (US)

(73) Assignee: Fresh Health Inc., Mountain View, CA (US)

(*) Notice: Subject to any disclaimer, the term of this patent is extended or adjusted under 35 U.S.C. 154(b) by 0 days.

(21) Appl. No.: 18/375,227

(22) Filed: Sep. 29, 2023

(51) Int. Cl.
*A61C 1/02* (2006.01)
*A61C 17/02* (2006.01)
*A61C 17/028* (2006.01)

(52) U.S. Cl.
CPC ........ *A61C 17/0211* (2013.01); *A61C 17/028* (2013.01)

(58) Field of Classification Search
CPC .................... A61C 17/0211; A61C 17/028
See application file for complete search history.

(56) References Cited

U.S. PATENT DOCUMENTS

| | | | | |
|---|---|---|---|---|
| 3,731,675 A | * | 5/1973 | Kelly | A61C 17/0211 601/164 |
| 6,893,259 B1 | * | 5/2005 | Reizenson | A61C 17/0211 433/29 |
| 2021/0085436 A1 | * | 3/2021 | Evans | A61C 17/0202 |

* cited by examiner

*Primary Examiner* — Quang D Thanh
(74) *Attorney, Agent, or Firm* — Van Pelt, Yi & James LLP

(57) ABSTRACT

An oral health device includes an oral insert and a fluid delivery system. The oral insert includes a plurality of manifolds for conveying fluid to orifices in the oral insert. The fluid delivery system including a manifold switching mechanism that selectively delivers pressurized fluid to a manifold selected from the plurality of manifolds. The manifold switching mechanism selectively aligns a gateway with one of the manifolds.

27 Claims, 18 Drawing Sheets

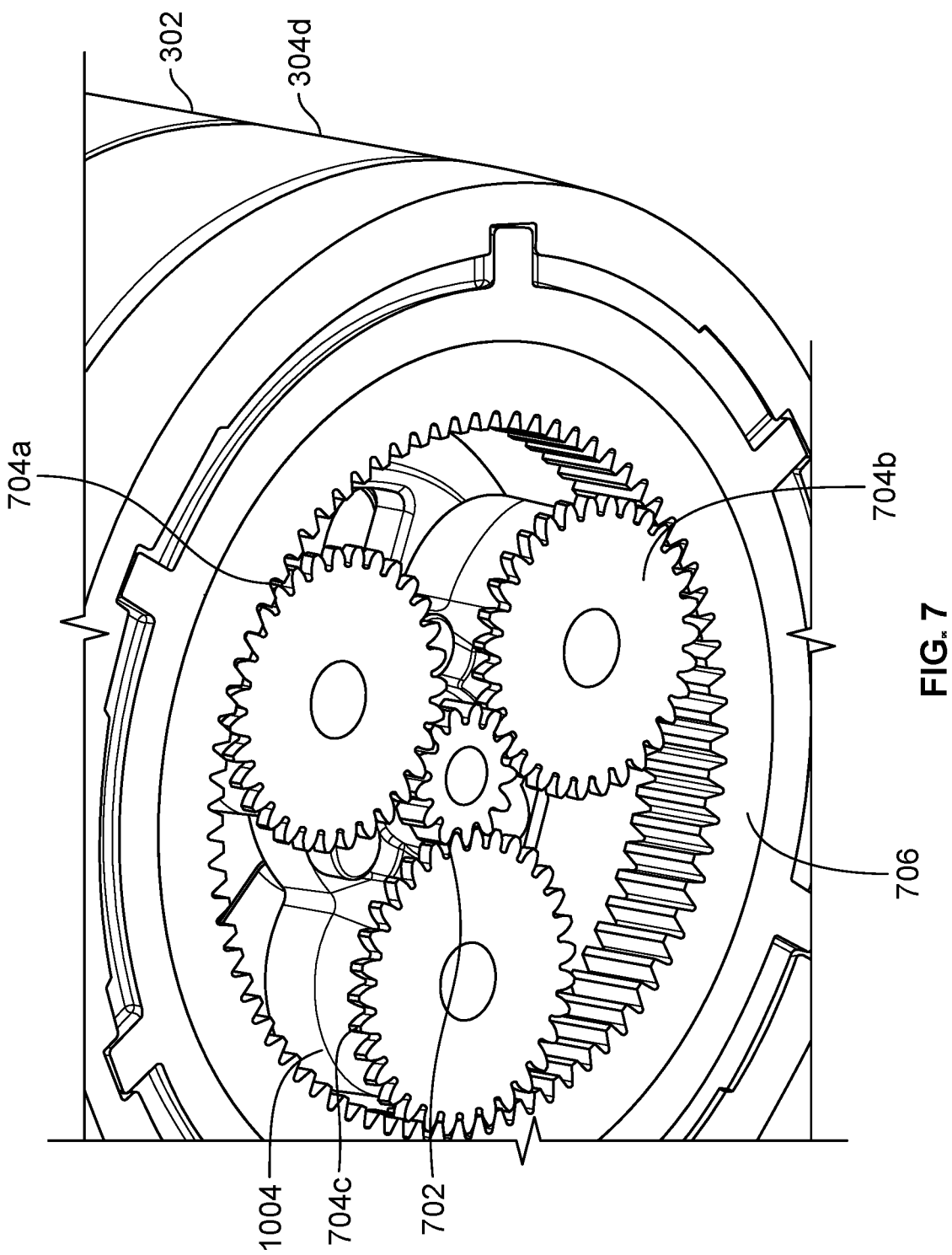

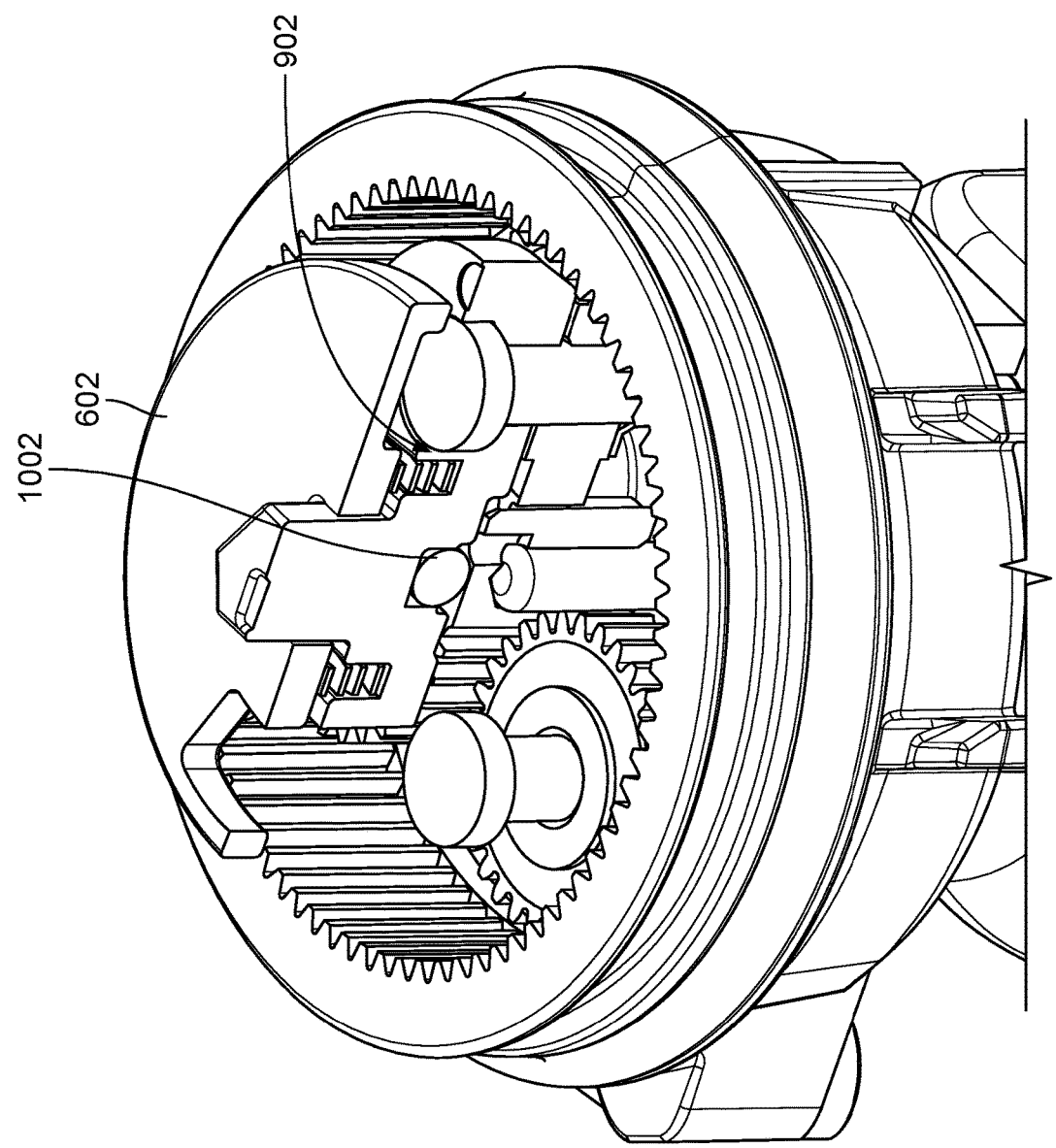

US 11,992,379 B1

ORAL HEALTH DEVICE HAVING A HANDLE WITH A MANIFOLD SWITCHING MECHANISM

BACKGROUND OF THE INVENTION

An oral health device may include a fluid reservoir, a pump, and an oral insert. The oral insert includes a plurality of manifolds and a plurality of fluid nozzles. Fluid is introduced into the fluid reservoir. A user may insert the oral insert into their mouth and subsequently turn on the oral health device. The plurality of fluid nozzles is located at locations customized to the oral anatomy of the user. When the oral health device is turned on, the pump causes fluid to exit the fluid reservoir and to be directed towards the oral anatomy of the user via the plurality of manifolds and the plurality of fluid nozzles.

The oral insert may be coupled to the fluid reservoir via a handle. The handle includes a motor and a manifold switch. The manifold switch is configured to select one of manifolds of the oral insert to which the fluid is to be provided. The selected manifold and associated fluid nozzles are configured to receive the fluid and direct the fluid towards a portion of the user's oral anatomy.

Other systems may utilize a radial seal to enable the manifold switch to select one of the manifolds. However, the radial seal may not prevent some fluid from being delivered to one or more non-selected manifolds while fluid is being directed to the selected manifold. That is, during operation of the oral health device, fluid may accidentally be directed to the fluid nozzles associated with one or more non-selected manifolds. This reduces the efficacy of the oral health device because the fluid pressure associated with the selected manifold is reduced.

BRIEF DESCRIPTION OF THE DRAWINGS

Various embodiments of the invention are disclosed in the following detailed description and the accompanying drawings.

FIG. 7 is a diagram illustrating a fourth portion of a handle seal in accordance with some embodiments.

FIG. 9 illustrates a bias mechanism in accordance with some embodiments.

DETAILED DESCRIPTION

Figure 1:
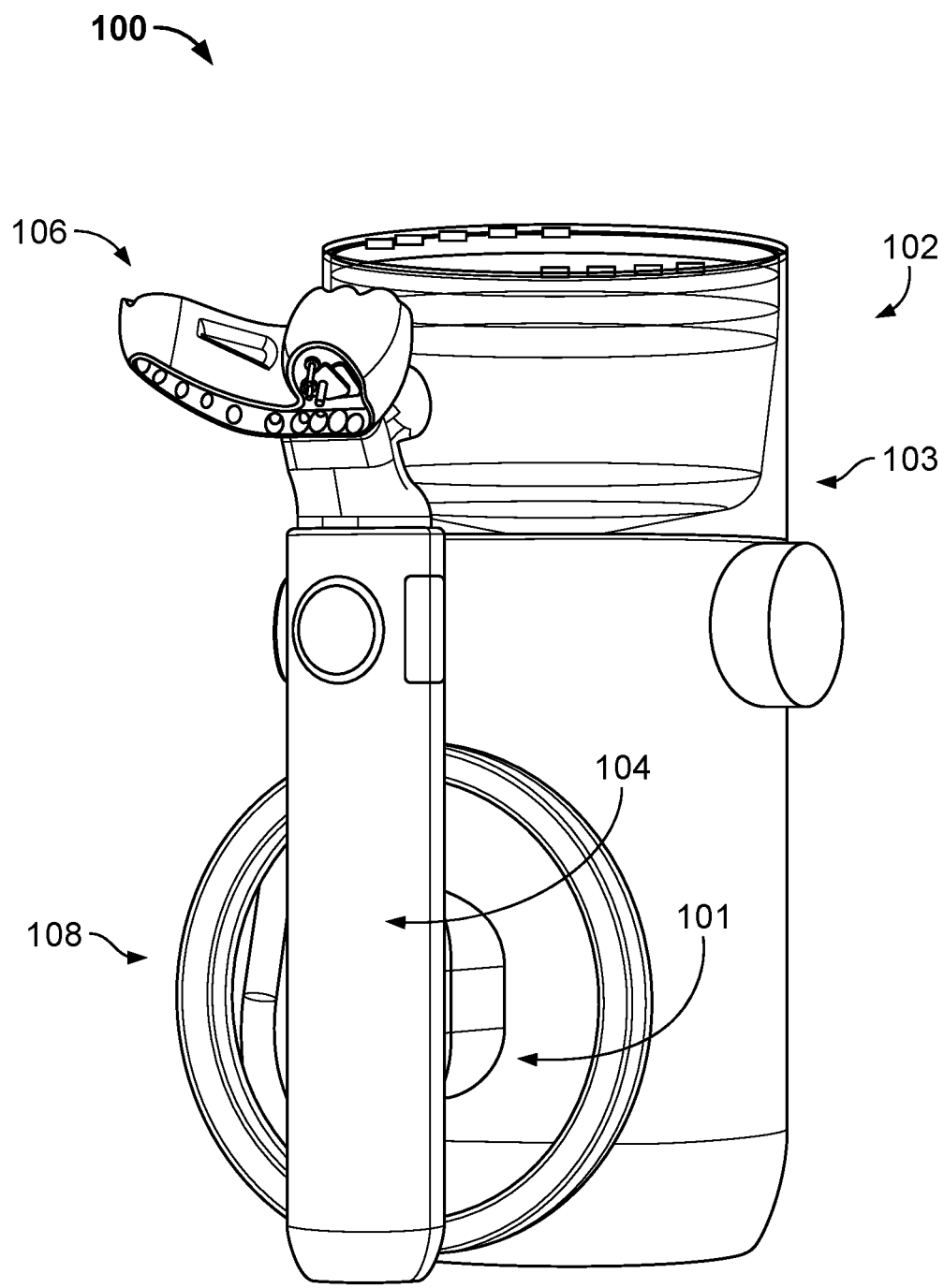
FIG. 1 is a diagram illustrating an oral health device for cleaning the oral anatomy of a user in accordance with some embodiments.

The invention can be implemented in numerous ways, including as a process; an apparatus; a system; a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An oral health device with a handle having an axial seal is disclosed. During operation of the oral health device, the axial seal may prevent fluid being delivered from the fluid reservoir to a selected manifold from being accidentally delivered from the fluid reservoir to one or more non-selected manifolds. The axial seal is comprised of a manifold disc having a plurality of holes, a manifold selector disc having an opening, and a low friction material located in between the manifold disc and the manifold selector disc. The manifold selector disc is coupled to a plurality of planet gears of a planetary gear carrier. A sun gear of the planetary gear carrier is coupled to a motor that causes the sun gear to rotate via a motor shaft. When the sun gear rotates, the planet gears also rotate, which causes the manifold selector disc to rotate.

The opening of the manifold selector disc is selectively aligned with the manifold disc such that it exposes one of the plurality of holes associated with the manifold disc and covers the other holes associated with the manifold disc. Each of the plurality of holes is associated with a corresponding manifold of an oral insert of the oral health device. Pressurized fluid is provided to the handle to an oral insert via the opening of the manifold selector disc and an exposed hole associated with the manifold disc. The pressurized fluid ultimately arrives at a plurality of fluid nozzles associated with the manifold that corresponds to the exposed hole. The pressurized fluid causes a force to be applied on the manifold selector disc in a direction towards the manifold disc. The amount of applied force causes the combination of the manifold selector disc, the low friction material, and the manifold disc to act as an axial seal that prevents fluid from being introduced into the manifolds corresponding to the covered holes associated with the manifold disc.

FIG. 1 is a diagram illustrating an oral health device for cleaning the oral anatomy of a user in accordance with some embodiments. In the example shown, device 100 includes a base station 102 having a fluid reservoir 103, a handle 104, and a customized oral insert or mouthpiece 106 coupled to the handle 104. One or more fluid conduits or tubes 105 may connect the fluid reservoir 103 to the handle 104 and to the mouthpiece 106. The handle 104 may comprise one or more control buttons (e.g., a start/stop button, a fluid flow adjustment dial), as may be desirable, which may be positioned variously on the handle for ergonomic or efficient use. The fluid retained in the fluid reservoir of device 100 may be water, saline, a mouth wash or rinse, (e.g., containing fluoride and/or germicidal or other cleaning and/or teeth protective fluids), and/or any other desirable additive.

The oral insert 106 is comprised of a plurality of fluid nozzles that are arranged in accordance with the unique geometry of the user's oral cavity, gingival geometry, and dental structures (and any oral and/or dental devices or implants). Examples of oral and/or dental devices or implants may include, but are not limited to, permanent and removable dental restorations/prosthetics, orthodontic appliances, and etc. (e.g., crowns, bridges, implants, braces, retainers, dentures, and the like). Each of the fluid nozzles (orifices) may be positioned to target a specific dental feature. Inside oral insert 106, the fluid nozzles may be connected to one or more internal manifolds. The inlets of these manifolds may extend from the back of the mouthpiece (or where desirable for ergonomic and/or efficient use) in the form of a standardized connector, to which a handle and/or one or more tubes may be connected.

Figure 2:
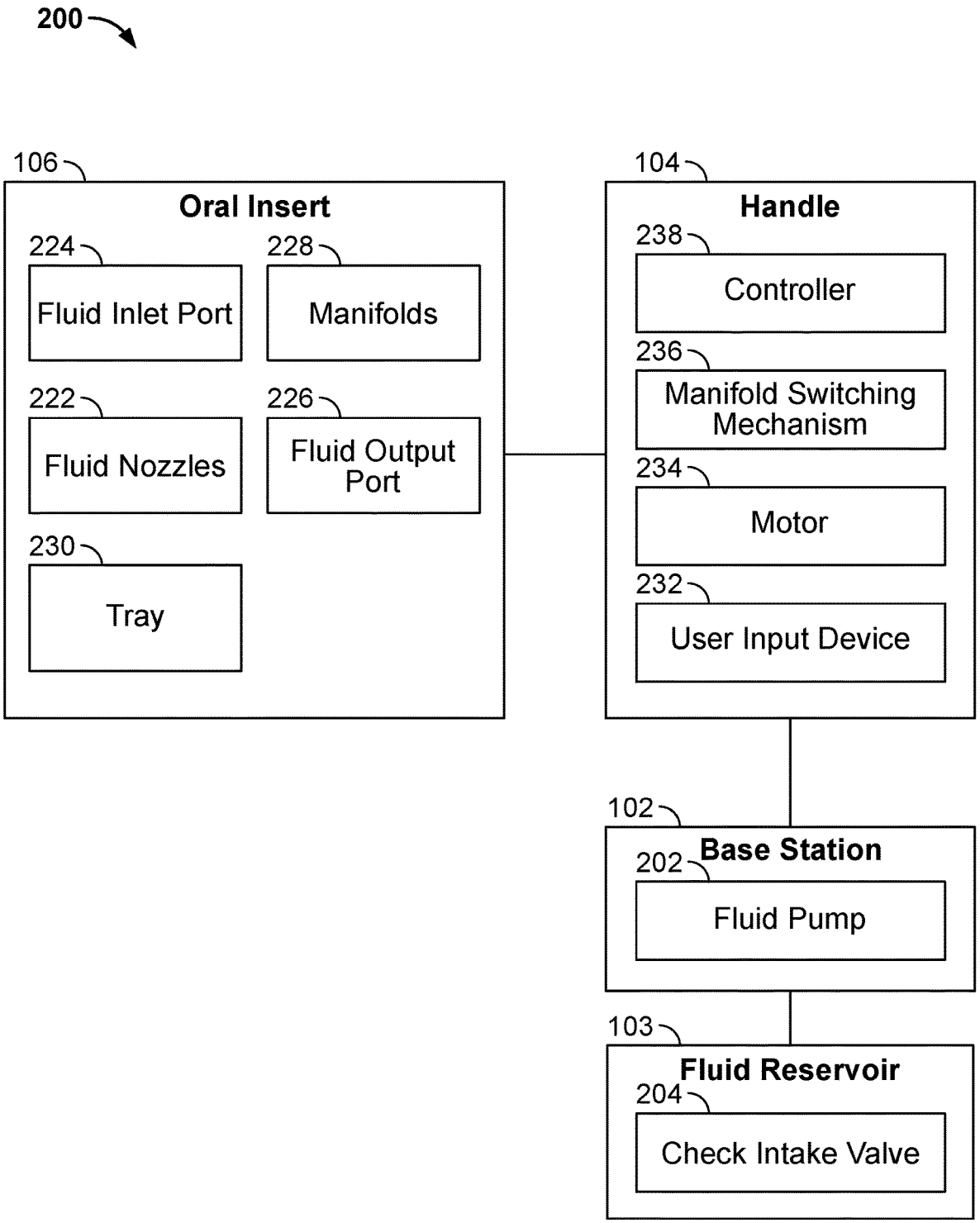
FIG. 2 is a block diagram illustrating an oral health device in accordance with some embodiments.

FIG. 2 is a block diagram illustrating an oral health device in accordance with some embodiments. Device 200 includes an oral insert 106 coupled to a fluid delivery system comprised of handle 104, fluid reservoir 103, and base station 102. Fluid reservoir 103 is releasably engaged to a base station 102. Base station 102 is releasably engaged to handle 104. Handle 104 is releasably engaged to oral insert 106.

Fluid reservoir 103 includes a check intake valve 204. In some embodiments, check intake valve 204 is located off-centered from a bottom surface of fluid reservoir 103. In some embodiments, check intake valve 204 is located at a center of the bottom surface of fluid reservoir 103.

Base station 102 includes fluid pump 202. Fluid pump 202 is configured to output pressurized fluid from fluid reservoir 103 to oral insert 106 via handle 104. Fluid pump 202 is configured to output pressurized fluid such that a flow rate of the pressurized fluid at each of the fluid nozzles 202 is the same flow rate within a predetermined tolerance. To provide an oral care treatment having a particular efficacy, fluid pump 202 is configured to provide a particular flow rate of fluid having a particular amount of pressure.

Handle 104 includes user input device 232. User input device 232 (e.g., a button, a switch, etc.) is configured to turn on/off motor 234 and fluid pump 202 in response to a user input. Manifold switching mechanism 236 includes a planetary gear carrier, a manifold selector disc, a low friction material, and a manifold disc. When in an "on" state, motor 234 is configured to cause a sun gear of the planetary gear carrier to rotate (clockwise or counterclockwise). The planetary gears of the planetary gear carrier are coupled to the manifold selector disc. The gears of the planetary gear carrier are configured to rotate when the sun gear of the planetary gear carrier rotates. As a result, the manifold selector disc also rotates. The rate at which the manifold selector disc rotates is based on a gear ratio associated with the planetary gear carrier and rotational speed of the motor 234.

The manifold disc is comprised of a plurality of holes. The plurality of holes is arranged in a circular pattern. In some embodiments, the plurality of holes is arranged in a different pattern. The holes may be a circle, rectangle, triangle, or other type of shape. Each hole corresponds to one of the manifolds 228 of oral insert 106. The manifold disc selector includes an opening having a shape and dimensions such that when one of the holes of the manifold disc is selected, the other non-selected holes of the manifold disc are not visible from the opening. In the "on" state, fluid is provided from fluid reservoir 103 to one of the manifolds 228 via the selected hole of the manifold disc. The configuration of the manifold switching mechanism 236 may prevent fluid from accidentally being introduced into the other manifolds via the other non-selected holes. The pressurized fluid causes a force to be applied on the manifold selector disc in a direction towards the manifold disc. A low friction material is situated between the manifold disc and the manifold selector disc. The low friction material reduces friction between the manifold disc and the manifold selector disc, and enables motor 234 to rotate the manifold selector disc via the planetary gear carrier.

Device 200 may be in a "cleaning" phase or a "transition" phase during a cleaning cycle of device 200. During the "cleaning" phase, one of the manifolds 228 is selected and an opening of the manifold disc selector exposes a first hole of the manifold disc that corresponds to the selected manifold. Fluid pump 202 causes pressurized fluid to be provided from fluid reservoir 103 and delivered to the selected manifold via handle 104. The pressurized fluid is provided to a user's mouth via the plurality of fluid nozzles that are associated with the selected manifold. Device 200 may be programmed to be in the "cleaning" phase for a particular amount of time (e.g., 1 second). In some embodiments, motor 234 causes the manifold disc selector to continuously rotate during the "on" state and the opening of the manifold disc selector is temporarily aligned with a hold of the manifold disc as the manifold disc selector rotates.

Motor 234 causes the manifold disc selector to continuously rotate during the "on" state and during the "transition" phase, motor 234 causes the manifold disc selector to rotate exposing a portion of the first hole of the manifold disc and a portion of a second hole of the manifold disc. Device 200 is in the "transition" phrase until the second hole of the manifold disc is completely exposed and the other holes of the manifold disc are completely covered. In some embodiments, device 200 may be programmed to be in the "transition" phase for a particular amount of time (e.g., 0.10 seconds).

Fluid is continuously provided by fluid pump 202 to handle 104 when device 200 is turn on until device 200 is turned off or until there is no longer any more fluid in fluid reservoir 103. In some embodiments, motor 234 is coupled to controller 238 that causes motor 234 to rotate according to the programmed "cleaning" and "transition" phases. In some embodiments, a rotational speed of the motor is the same during the "cleaning" phase and the "transition" phase. In some embodiments, a rotational speed of the motor is different during the "cleaning" phase and the "transition" phase. In some embodiments, device 200 is programmed to perform a cleaning process in less than a particular amount of time (e.g., 8 seconds), that is, each of the holes of the manifold disc have been completely exposed by the manifold disc selector at some point in time during the cleaning process.

The fluid structures defined by the oral insert 106 may comprise a fluid inlet port 224, a set of manifolds 228, a set of fluid nozzles 222, and a fluid outlet port (e.g., effluence port) 226. The oral insert 106 may define a tray 230 configured to retain teeth (e.g., upper teeth, lower teeth). The tray 230 may be configured such that at least a portion of the tray 230 corresponds to a shape of the user's teeth.

Oral insert 106 is configured to receive fluid from the fluid reservoir 103 at fluid inlet port 224. Fluid inlet port 224 is configured to be in fluid communication with the set of manifolds 228 and the set of nozzles 222. In one embodiment, oral insert 106 includes a set of 8 manifolds where each manifold includes 8 fluid nozzles. Fluid output from the set of nozzles 222 may be directed at the user's oral anatomy, for example, through the interproximal spaces between the teeth. A nozzle may be positioned at any location on a manifold. However, the nozzle position is specific to the oral structure of a user. After the fluid passes through and/or irrigates the user's oral anatomy, the fluid may then be guided to the fluid outlet port 226 to exit the user's oral cavity. In some variations, fluid may flow sequentially into fluid inlet 224 and through the set of manifolds 228 and their respective nozzles 222. The set of nozzles 222 may be configured to output fluid toward oral anatomy. Fluid outlet port 226 may then receive the fluid (e.g., effluence) and channel it away from the oral anatomy.

Figure 3A:
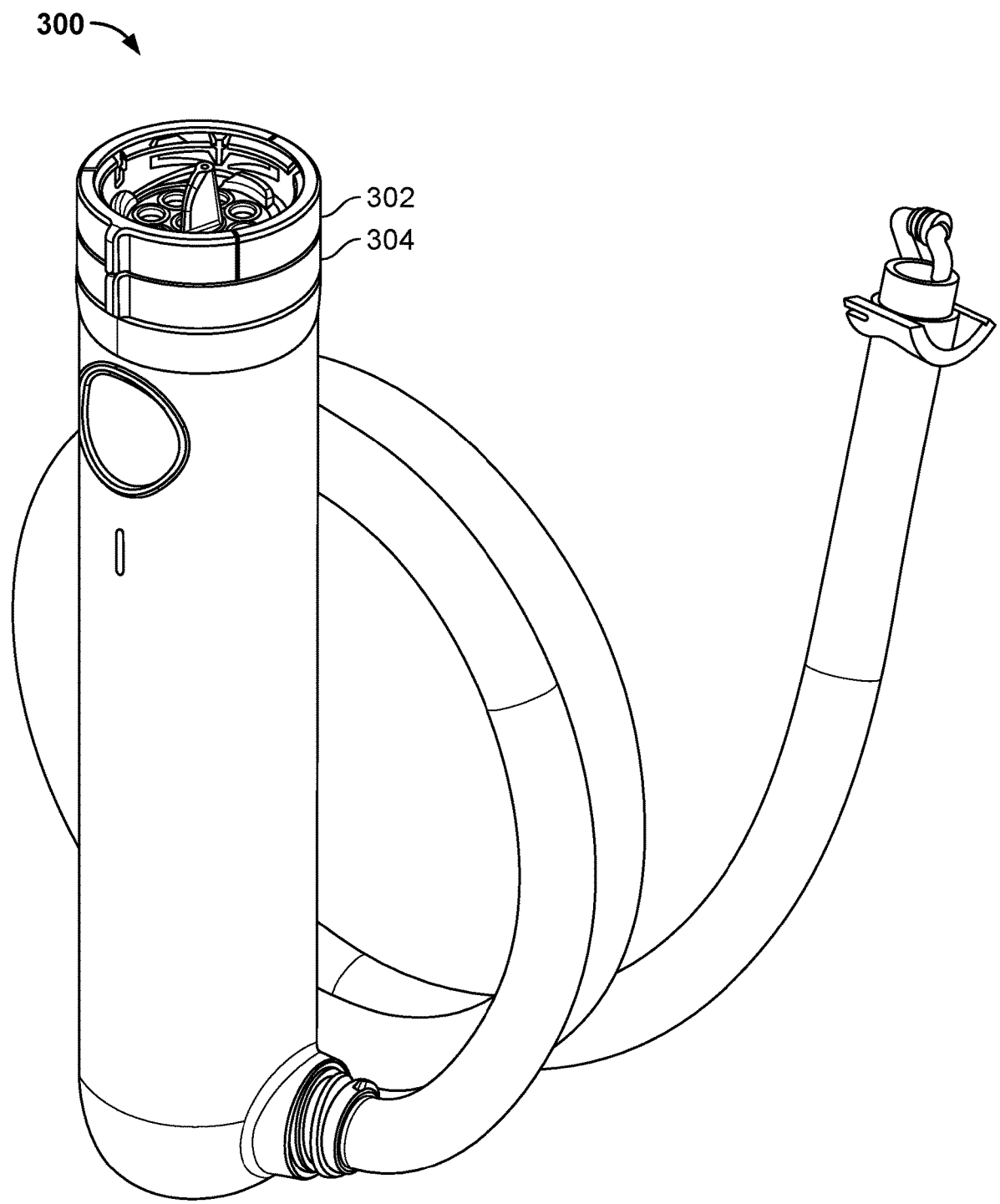
FIG. 3A is a diagram illustrating a handle in accordance with some embodiments.
Figure 3B:
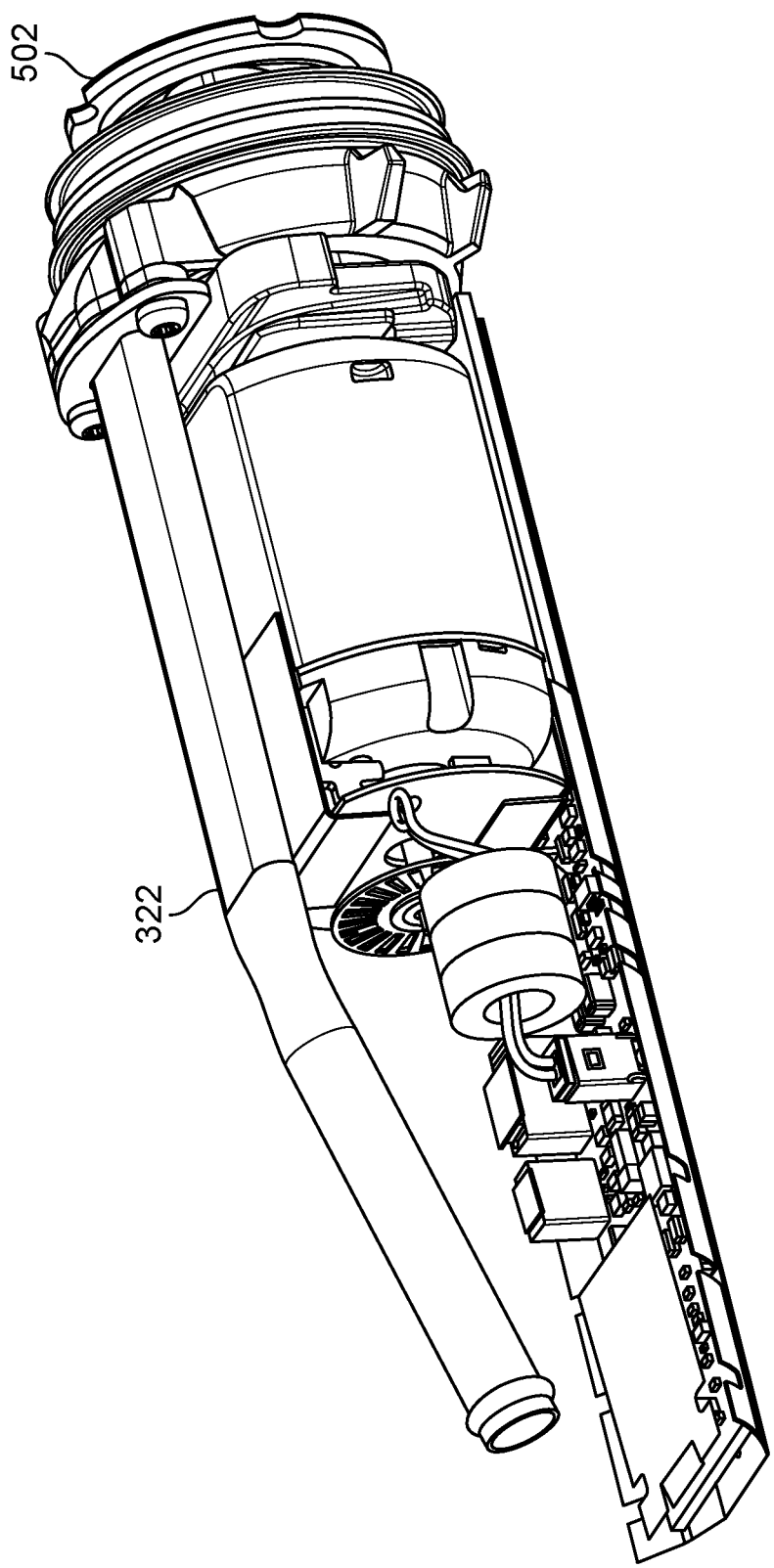
FIG. 3B is a diagram illustrating a perspective view of the interior components of a handle in accordance with some embodiments.
Figure 3C:
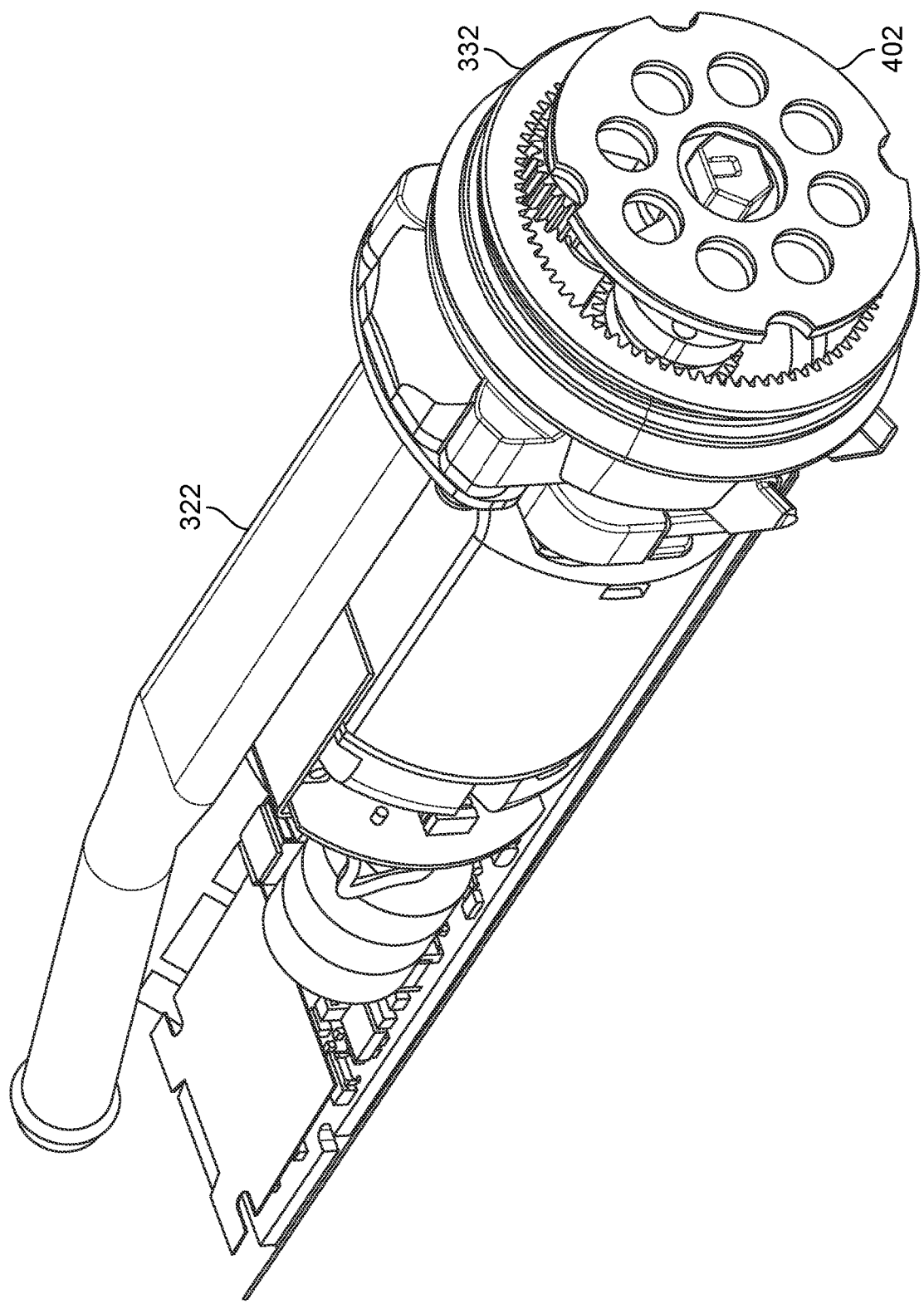
FIG. 3C is a diagram illustrating a perspective view of the interior components of a handle in accordance with some embodiments.
Figure 3D:
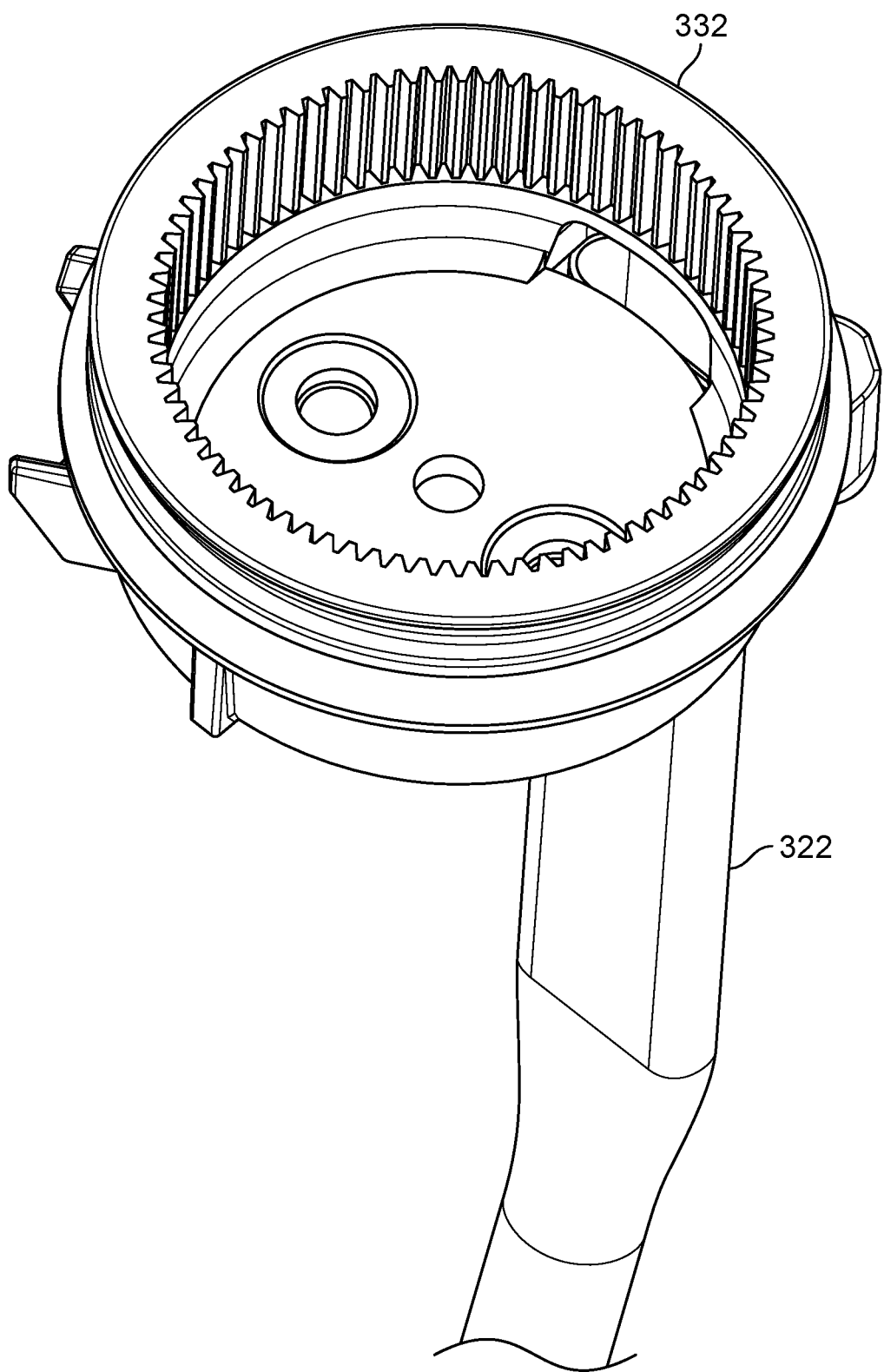
FIG. 3D is a diagram illustrating a perspective view of a gearbox of a handle in accordance with some embodiments.

FIG. 3A is a diagram illustrating a handle in accordance with some embodiments. In the example shown, handle 300 includes handle seal 304 coupled to a mouthpiece seal 302. As seen in FIGS. 3B and 3C, the interior of the handle 300 includes a plurality of components and a tube 322. As seen in FIG. 3D, tube 322 is configured to provide fluid to the gearbox 332.

Figure 4:
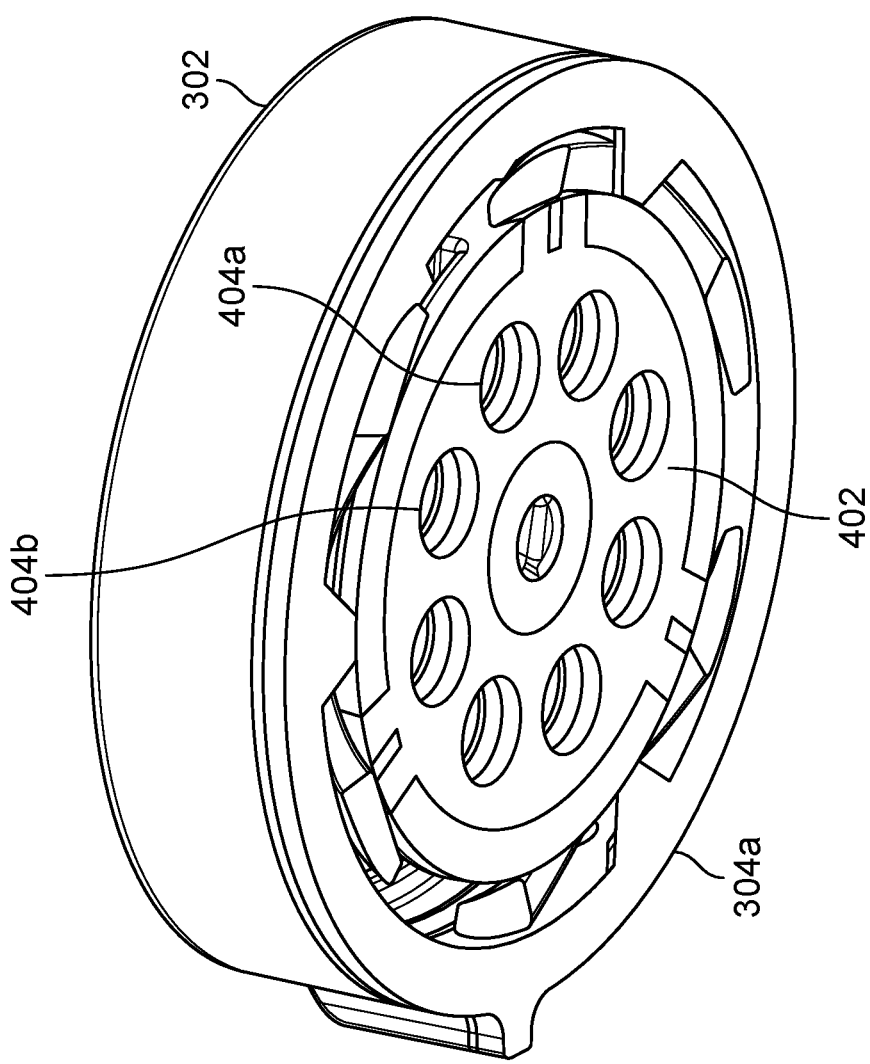
FIG. 4 is a diagram illustrating a first portion of a handle seal in accordance with some embodiments.

FIG. 4 is a diagram illustrating a first portion of the handle seal in accordance with some embodiments. In the example shown, the first portion 304a of the handle seal 304 includes a manifold disc 402 that includes a plurality of holes. Each of the plurality of holes is associated with a corresponding manifold of an oral insert.

In the example shown, manifold disc 402 includes eight holes, such as holes 404a, 404b. Oral insert 106 may include eight internal manifolds. Each of the internal manifolds of oral insert 106 is associated with one of the eight holes of manifold disc 402.

Figure 5A:
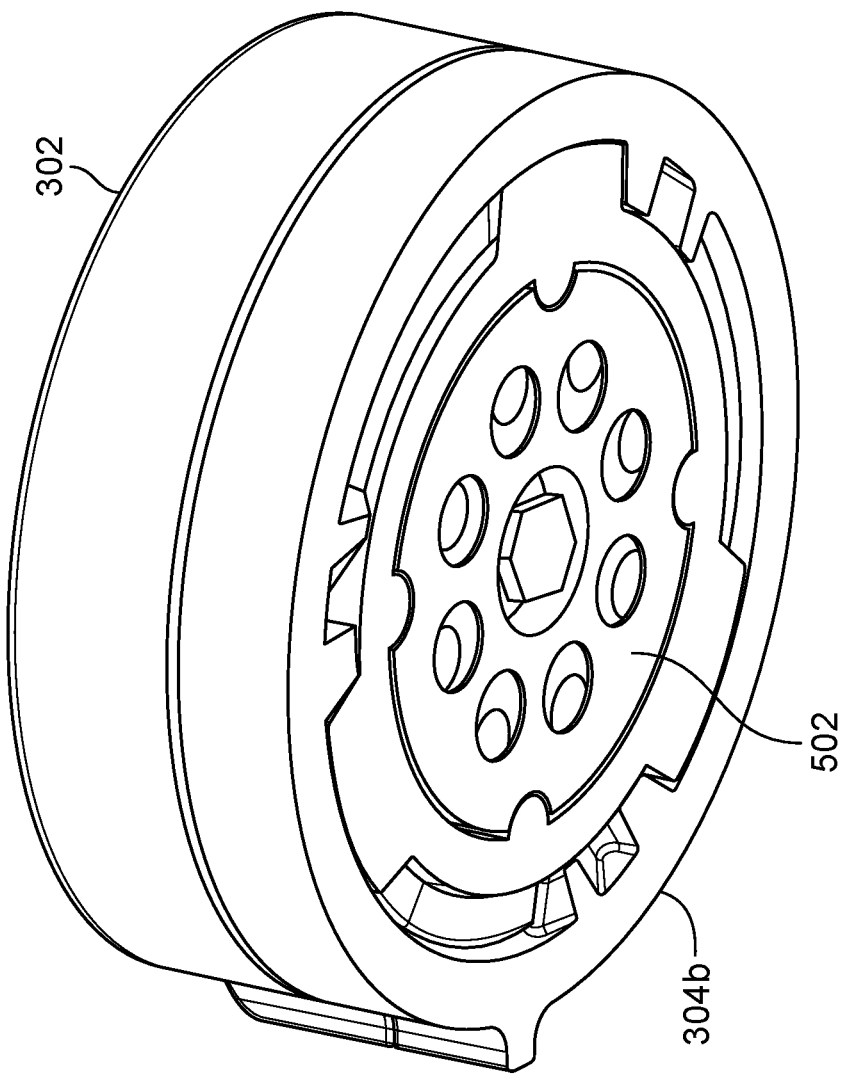
FIG. 5A is a diagram illustrating a second portion of a handle seal in accordance with some embodiments.
Figure 5B:
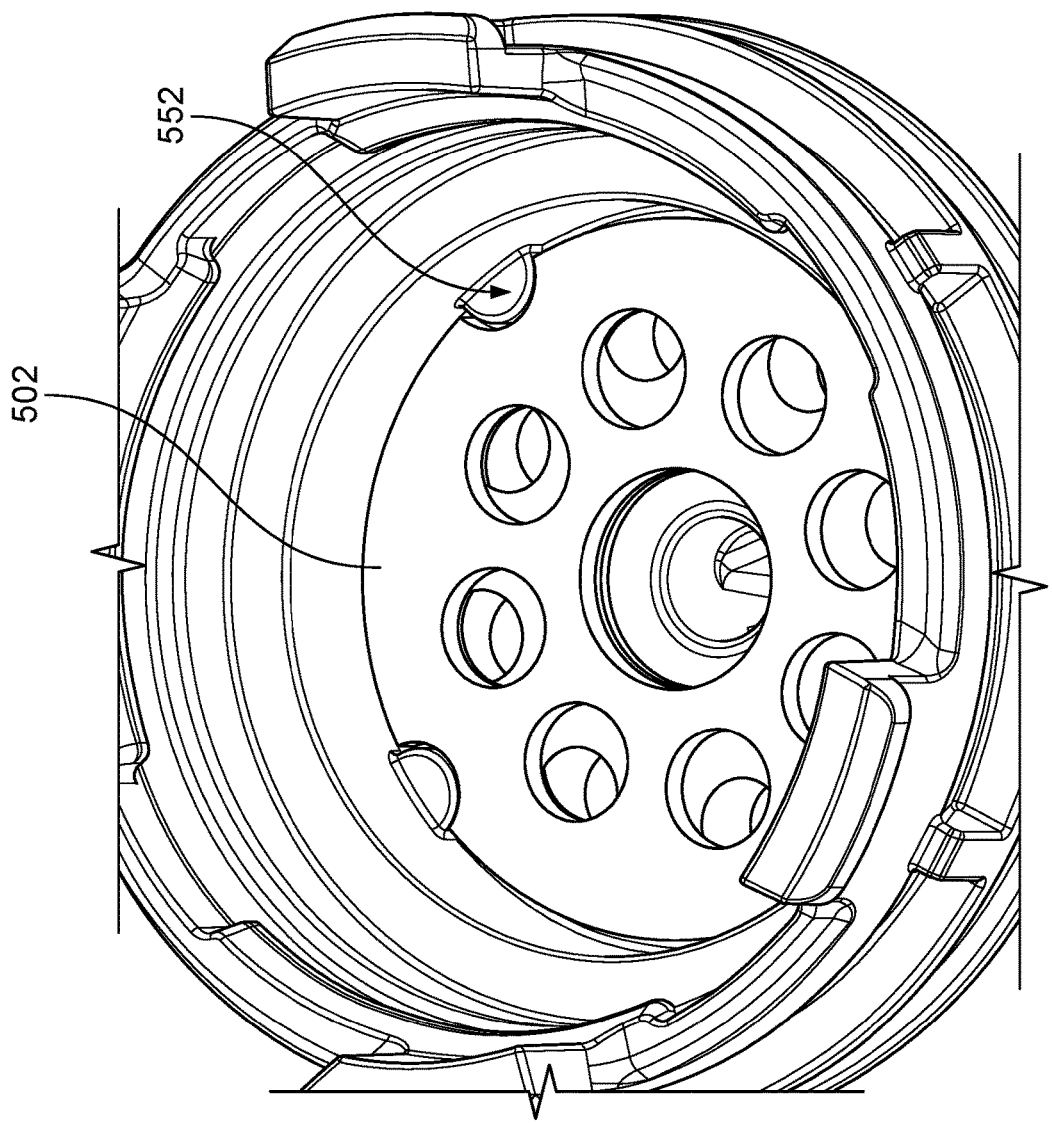
FIG. 5B is a diagram illustrating a second portion of a handle seal in accordance with some embodiments.

FIGS. 5A and 5B are diagrams illustrating a second portion of the handle seal in accordance with some embodiments. In the example shown, the second portion 304b of the handle seal 304 includes a low friction material 502 (e.g., a material having a friction coefficient less than a threshold value). Examples of low friction material 502 include, but are not limited to, POM (PolyOxyMethylene), POM-C (Acetal Copolymer), or POM-H (Delrin). The low friction material 502 includes a same number of holes as manifold disc 402. In the example shown, low friction material 502 also includes eight holes. In some embodiments, as seen in FIG. 5B, the low friction material 502 is held in place by one or more anti-rotation keys 552. The holes associated with low friction material 502 may become misaligned with the holes associated with manifold disc 402. This may restrict or block the flow of fluid through a selected hole associated with manifold disc 402. The one or more anti-rotation keys 552 may prevent a misalignment of low friction material 502 with manifold disc 402.

Figure 6:
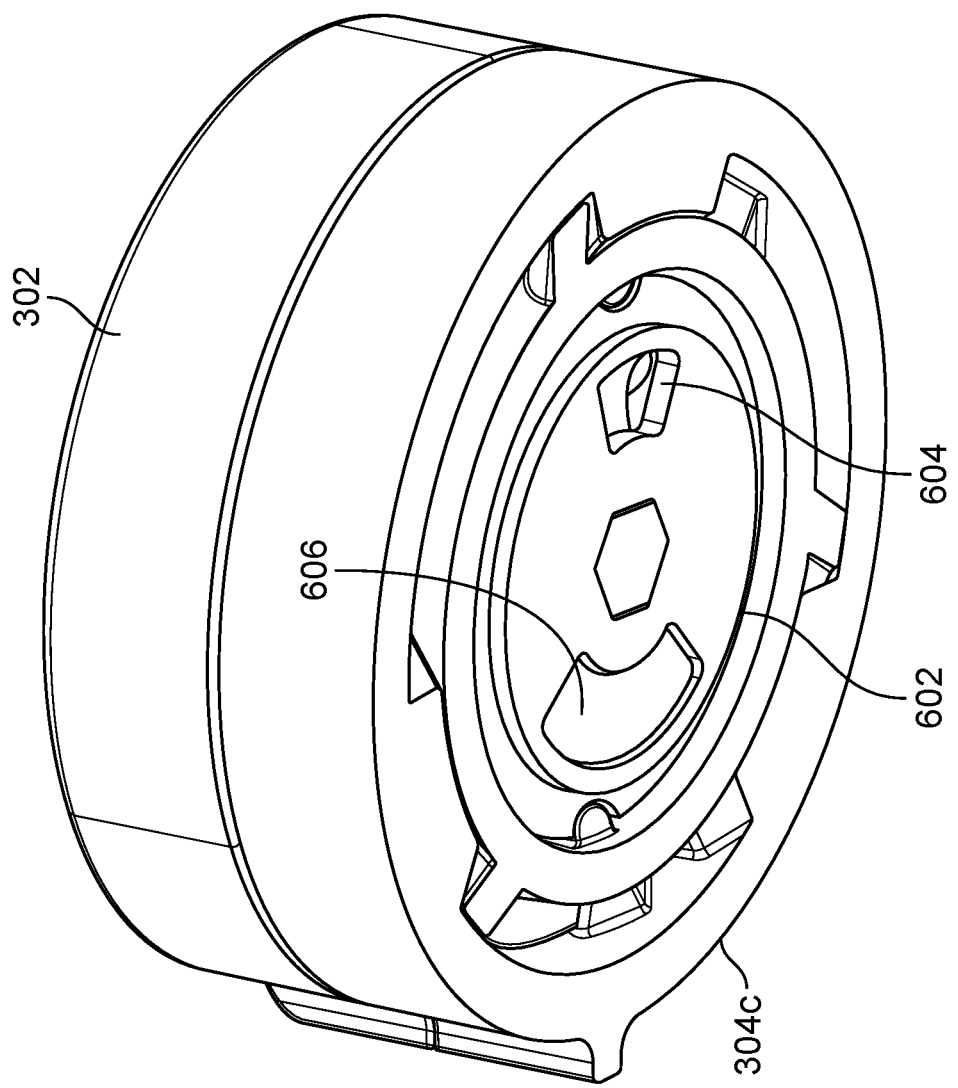
FIG. 6 is a diagram illustrating a third portion of a handle seal in accordance with some embodiments.
Figure 8A:
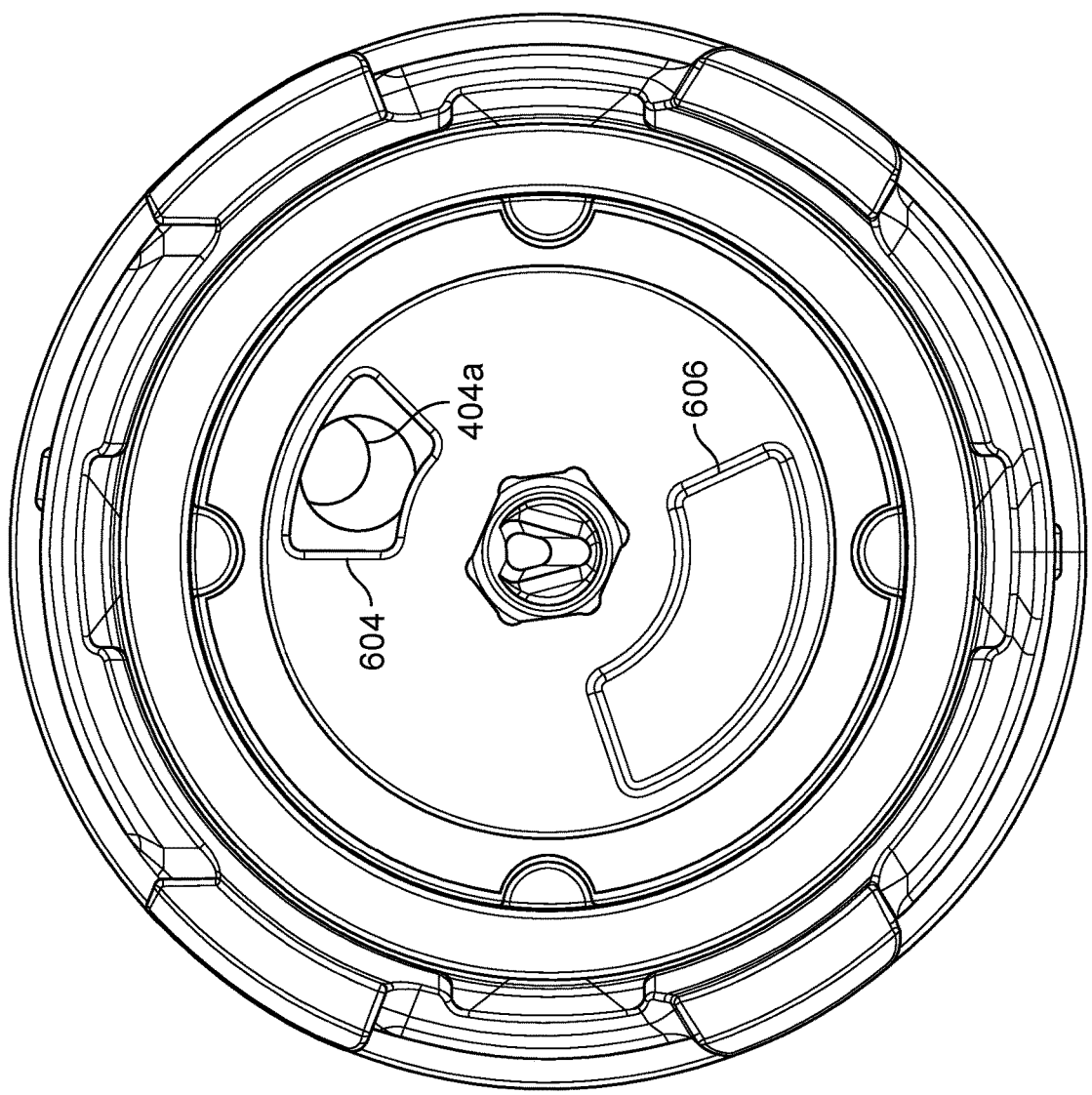
FIG. 8A illustrates a manifold selector disc in a first position in accordance with some embodiments.
Figure 8B:
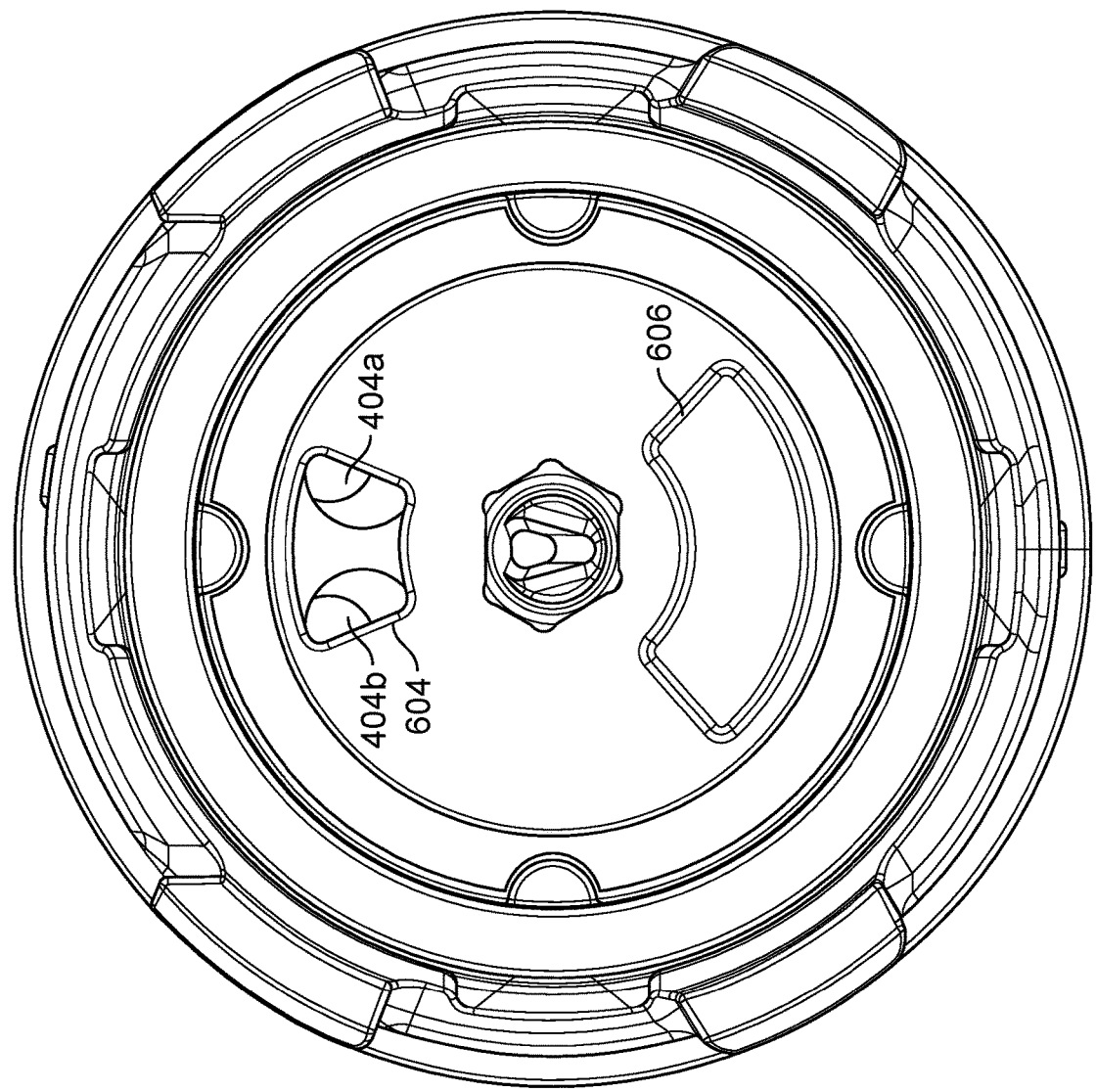
FIG. 8B illustrates the manifold selector disc transitioning from the first position to the second position in accordance with some embodiments.

FIG. 6 is a diagram illustrating a third portion of the handle seal in accordance with some embodiments. In the example shown, the third portion 304c of the handle seal 304 includes a manifold selector disc 602. The manifold selector disc 602 includes an opening 604 (also referred to as a "gateway"). In the example shown, opening 604 has a trapezoidal shape. Opening 604 may have other shapes. As seen in FIG. 8A, opening 604 has size and dimensions such that only one of the holes 404b of manifold disc 402 is exposed when the manifold associated with the hole is selected. When transitioning between a first manifold and a second manifold, as seen in FIG. 8B, opening 604 is configured to expose a portion of a first hole of manifold disc 402 corresponding to the first manifold and a portion of a second hole of manifold disc 402 corresponding to the second manifold.

Figure 13:
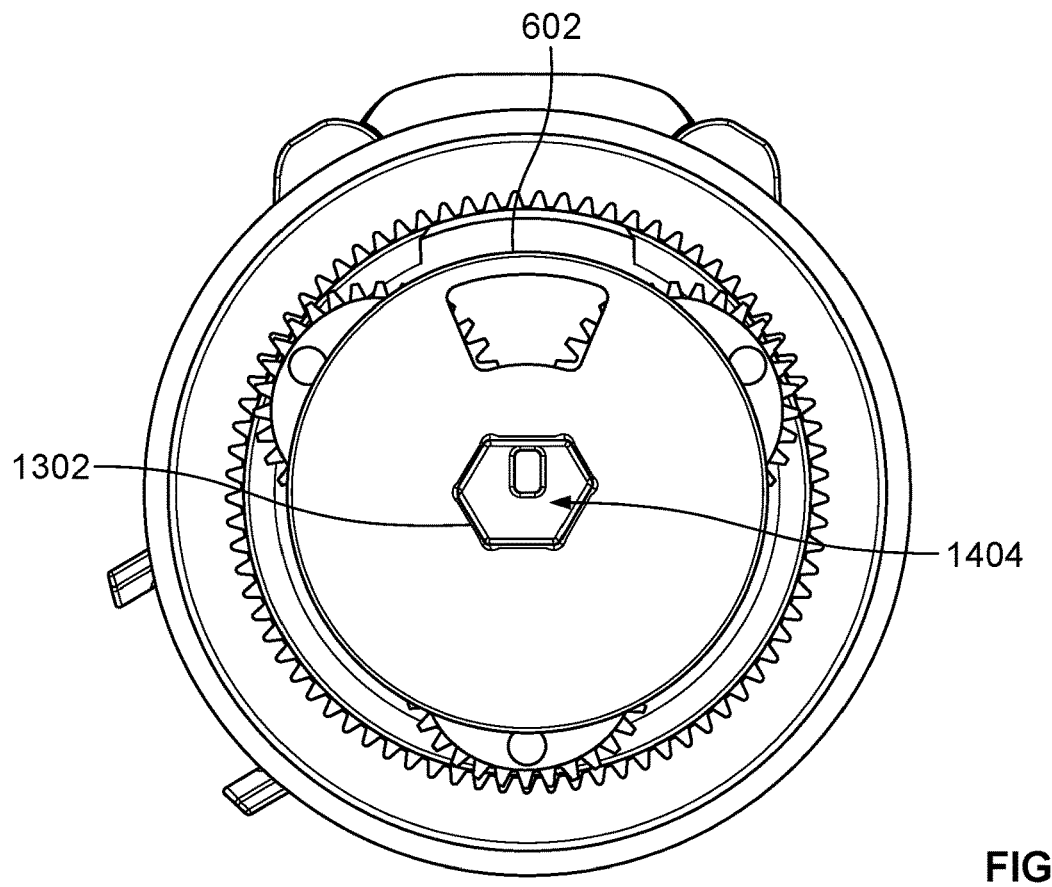
FIG. 13 illustrates a top-down view of a manifold disc selector in accordance with some embodiments.
Figure 14A:
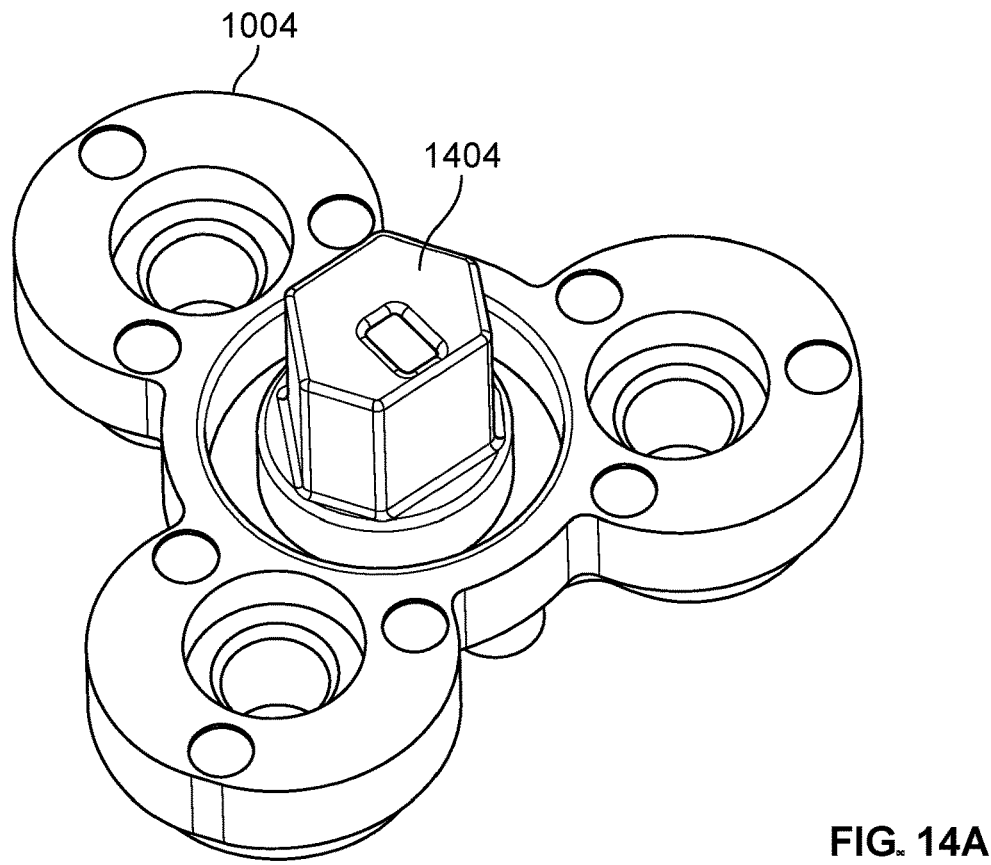
FIG. 14A illustrates a perspective view of a planetary carrier in accordance with some embodiments.
Figure 14B:
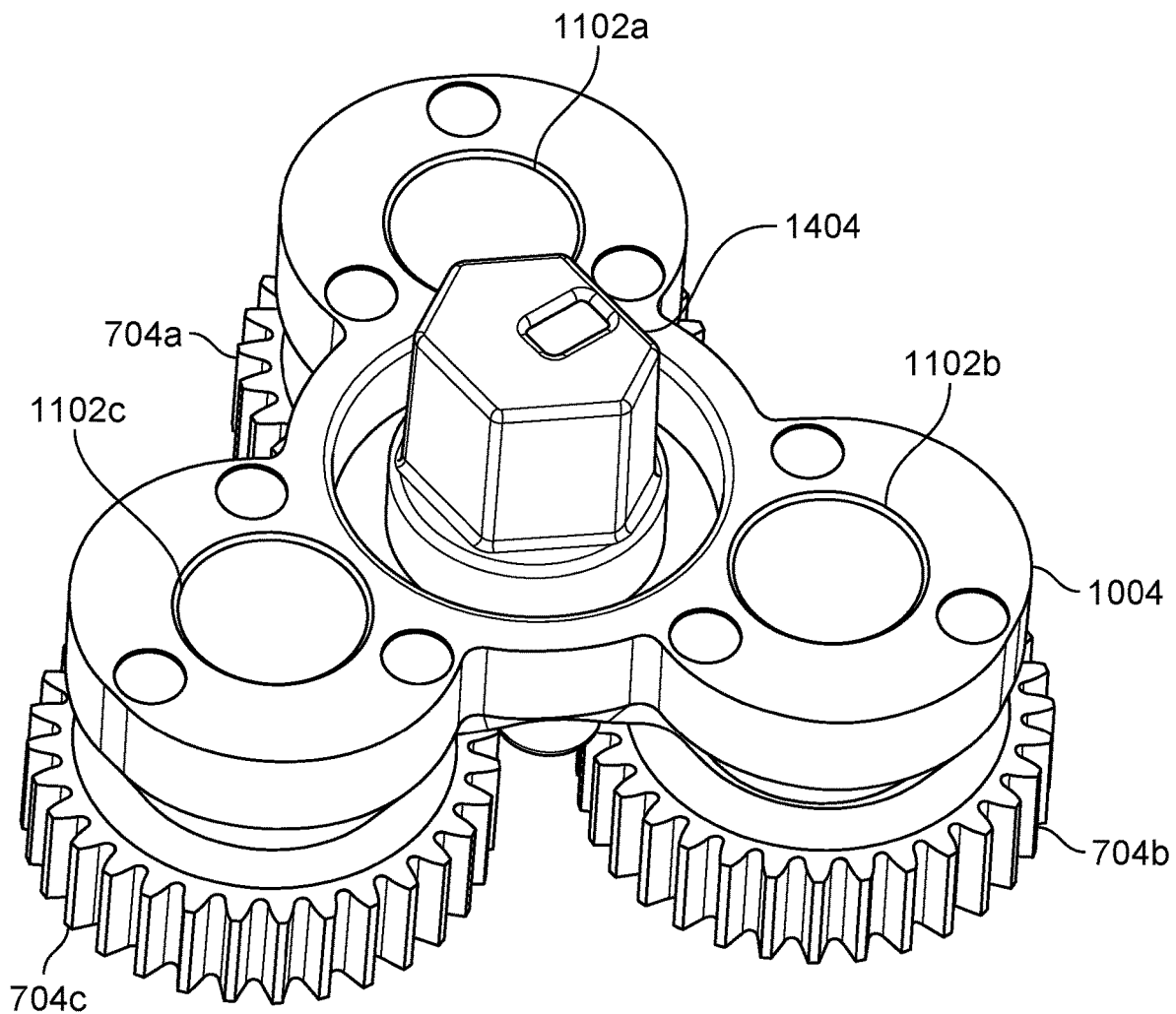
FIG. 14B illustrates a perspective view of a planetary carrier coupled to a plurality of planetary gears in accordance with some embodiments.

In some embodiments, as seen in FIG. 13, manifold selector disc 602 includes a shaft opening 1302. The shape of shaft opening 1302 corresponds to a shape of a stub shaft 1404 of planetary carrier 1002. As seen in FIG. 14A, stub shaft 1404 has an asymmetrical shape. As a result, there is a unique way in which stub shaft 1404 fits into shaft opening 1302. The opening 604 of the manifold selector disc 602 needs to be in a specific location relative to the planetary carrier so that the fluid can flow between the gears, through the manifold selector disc 602, and a selected manifold of manifold disc 402. A defective assembly may be constructed if the manifold selector disc 602 is not uniquely keyed to planetary carrier 1402 because the opening 604 may be largely blocked by one of the gears and/or carrier arms. FIG. 14B depicts planetary carrier 1004 being coupled to planetary gears 704a, 704b, 704c.

In some embodiments, as seen in FIG. 9, a bias mechanism (e.g., a spring) 902 may provide a bias sealing force to manifold selector disc 602, even without flow being provided through opening 604.

Manifold selector disc 602 includes a rotation balancing cutout 606. The rotation balancing cutout 606 is located antipodal (diametrically opposite) to the opening 604. The rotation balancing cutout 606 has a volume that is substantially equal (within a threshold tolerance) of the volume of opening 604. This is to ensure that the manifold selector disc 602 is balanced (e.g., prevent wobble, reduce vibration) when the manifold selector disc 602 rotates. In some embodiments, rotation balancing cutout 606 has a thickness that is half a thickness of manifold selector disc 602. In other embodiments, the rotation balancing cutout 606 may have other thicknesses and dimensions, so long as the volume of the rotation balancing cutout 606 is substantially equal to the volume of opening 604.

FIG. 7 is a diagram illustrating a fourth portion of the handle seal in accordance with some embodiments. In the example shown, the fourth portion 304d of the handle seal 304 includes a planetary gear carrier comprised of a sun gear 702, a first planet gear 704a, a second planet gear 704b, a third planet gear 704c, and a ring gear 706. The planetary gear carrier includes a carrier that is not shown for illustrative purposes. Although the planetary gear carrier is depicted as including three planet gears, the planetary gear carrier may have 2:n planet gears.

Figure 11:
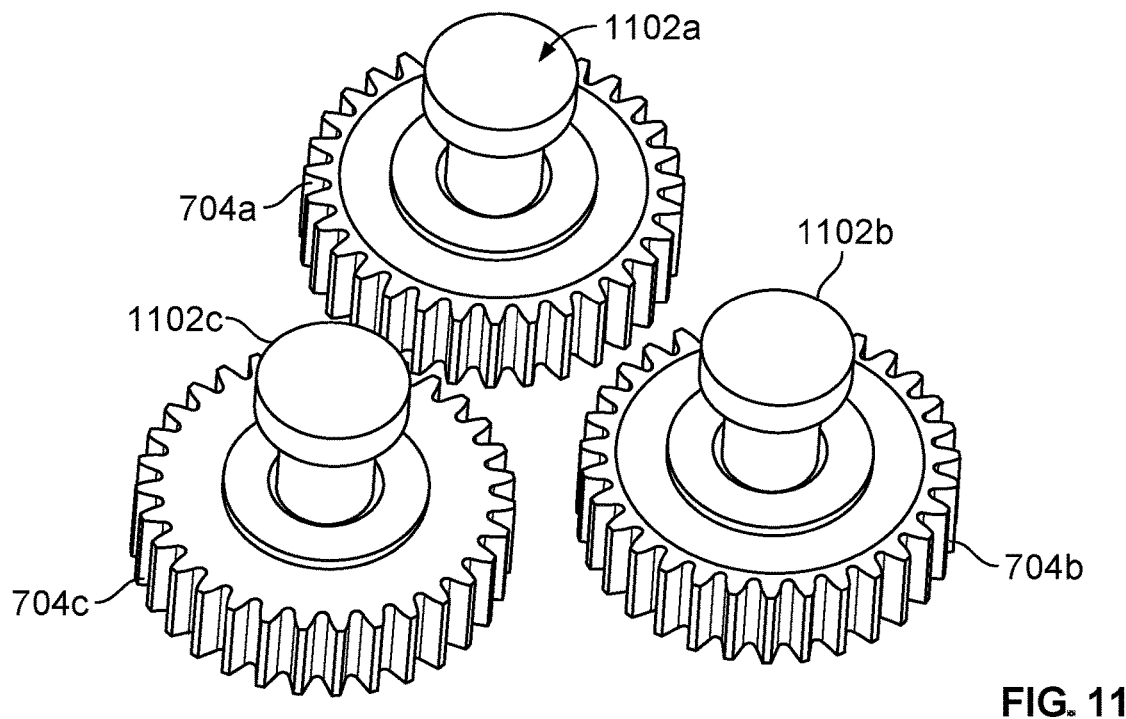
FIG. 11 illustrates planetary gears and corresponding axles in accordance with some embodiments.
Figure 12:
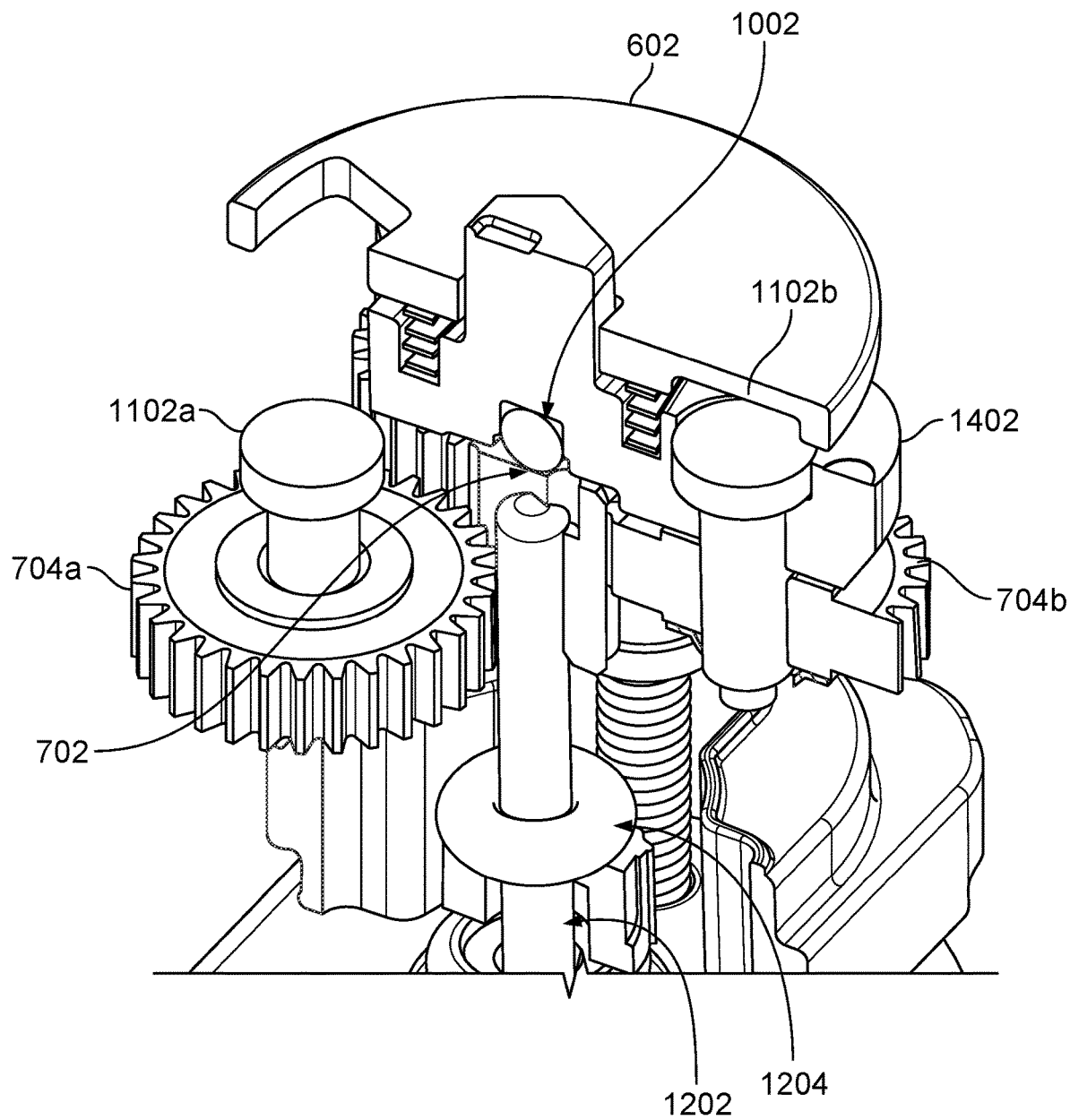
FIG. 12 illustrates a perspective view of the internal components of a gearbox in accordance with some embodiments.

The sun gear 702 is coupled to a motor, such as motor 234, via motor shaft 1102. Motor 234 is configured to cause the sun gear 702 to rotate. The first planet gear 704, the second planet gear 704b, and the third planet gear 704 are coupled to the manifold selector disk 602. When the sun gear 702 rotates, the first planet gear 704, the second planet gear 704b, and the third planet gear 704 cause the manifold selector disk 602 to rotate. As seen in FIG. 11, the planet gears 704a, 704b, 704c are configured to rotate around axles 1102a, 1102b, 1102c, respectively. The rate at which the manifold selector disc 602 rotates depends on the gear ratio associated with the planetary gear carrier and rotational speed of the motor. In one embodiment, the gear ratio is 7:1 or approximately 7:1 (within a threshold). As seen in FIG. 12, a bottom portion of motor shaft 1202 is sealed from the other parts of the handle seal via O-ring 1204. O-ring 1204 seals the switcher chamber that includes the planetary gear carrier/manifold selector disk assembly from the motor and other handle electronics, such as the electronics associated with user input device 232. The location of O-ring 1204 enables a smaller and cheaper motor to be used for the oral health device. Drag torque is a function of sealing radius. If the seal was placed on the outside of the planetary gear carrier, then a diameter of motor shaft 1202 would need to be 2-3× larger because the torque would have been amplified by the gearing, so the friction would have been 2-3× higher.

Figure 10:
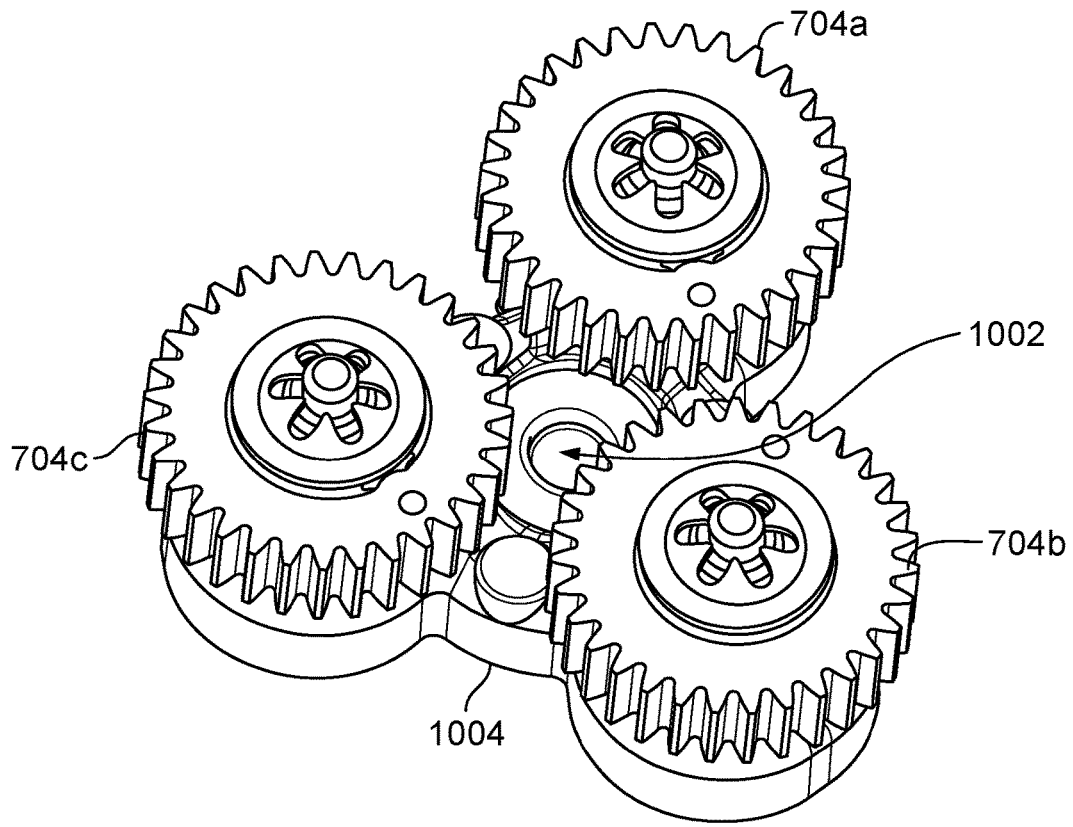
FIG. 10 illustrates a point contact bearing in accordance with some embodiments.

Point contact bearing 1002, as seen in FIG. 10A enables the planetary gear carrier 1004 to pivot along two axes (e.g., pitch and yaw) while enabling the planetary gear carrier/manifold selector disk assembly to rotate. Without point contact bearing 1002, the planetary gear carrier/manifold selector disk assembly may be over-constrained by the motor shaft, such that manifold selector disc 602 may not seal flat against manifold disc 402. Point contact bearing 1002 is configured to dynamically absorb the manifold selector disc 602 to manifold disc 402 misalignment due to manufacturing and assembly tolerances. As a result, point contact bearing 1002 enables manifold selector disc 602 to be fully sealed against manifold disc 402.

Pressure causes a force to be applied on the manifold selector disc 602 in a direction towards the manifold disc 402. Such pressure may prevent the manifold selector disc 602 from rotating. However, low friction material 502 is located in between the manifold selector disc 602 and the manifold disc 402 to enable the manifold selector disc 602 to rotate when the oral health device is turned on.

FIG. 8A illustrates a manifold selector disc in a first position in accordance with some embodiments. As seen in FIG. 8A, a first hole 404a corresponding to a first manifold is exposed (e.g., the selected manifold) and the holes of the manifold disc corresponding to the non-selected manifolds are covered by the manifold selector disc.

FIG. 8B illustrates the manifold selector disc transitioning from the first position to a second position in accordance with some embodiments. When transitioning between a first manifold hole 404a and a second manifold 404b, opening 604 is configured to expose a portion of a first hole of manifold disc 402 and a portion of a second hole of manifold disc 402.

During operation of the oral health device, at least a portion of one of the holes of manifold disc 402 is exposed by opening 604. This may reduce the vibrations and noise associated operating the oral health device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An oral health device, comprising:
   an oral insert including a plurality of manifolds for conveying fluid to orifices in the oral insert; and
   a fluid delivery system including a manifold switching mechanism that selectively delivers pressurized fluid to a manifold selected from the plurality of manifolds, wherein the manifold switching mechanism selectively aligns a gateway with one of the manifolds.

2. The oral health device of claim 1, wherein the manifold switching mechanism is an axial seal.

3. The oral health device of claim 1, wherein the manifold switching mechanism includes a manifold disc and a manifold selector disc.

4. The oral health device of claim 3, wherein the fluid delivery system includes a bias mechanism that applies a force to the manifold selector disc.

5. The oral health device of claim 3, wherein a low friction material is located between the manifold disc and the manifold selector disc.

6. The oral health device of claim 5, wherein the low friction material is held in place using one or more anti-rotation keys.

7. The oral health device of claim 3, wherein the manifold disc includes a first plurality of holes.

8. The oral health device of claim 7, wherein each hole of the first plurality of holes corresponds to one of the manifolds.

9. The oral health device of claim 8, wherein the manifold selector disc includes an opening.

10. The oral health device of claim 9, wherein the opening has a shape that exposes one of the first plurality of holes and covers remaining holes of the first plurality of holes during a cleaning phase.

11. The oral health device of claim 9, wherein the opening has a shape that exposes a first portion of a first hole of the first plurality of holes and a second portion of a second hole of the first plurality of holes during a transition phase.

12. The oral health device of claim 7, wherein a low friction material located between the manifold disc and the manifold selector disc includes a second plurality of holes, wherein a first number of holes included in the first plurality of holes is equal to a second number of holes included in the second plurality of holes.

13. The oral health device of claim 3, wherein the manifold selector disc includes an opening and a cutout portion.

14. The oral health device of claim 13, wherein a first volume of the opening is substantially equal to a second volume of the cutout portion.

15. The oral health device of claim 13, wherein the opening is located diametrically opposite to the cutout portion.

16. The oral health device of claim 3, wherein the manifold selector disc is coupled to a planetary gear carrier.

17. The oral health device of claim 16, wherein the planetary gear carrier includes three planet gears.

18. The oral health device of claim 16, wherein the planetary gear carrier includes a sun gear that is coupled to a motor via a motor shaft.

19. The oral health device of claim 18, wherein an O-ring seal is located on the motor shaft between the sun gear and the motor.

20. The oral health device of claim 16, wherein the planetary gear carrier has a gear ratio of 7:1.

21. The oral health device of claim 16, wherein the planetary gear carrier causes the manifold selector disc to rotate counterclockwise.

22. The oral health device of claim 16, wherein the planetary gear carrier causes the manifold selector disc to rotate clockwise.

23. The oral health device of claim 16, wherein the planetary gear carrier is coupled to a point contact bearing.

24. The oral health device of claim 16, wherein the planetary gear carrier includes a stub shaft.

25. The oral health device of claim 24, wherein the stub shaft is asymmetrical.

26. The oral health device of claim 25, wherein the asymmetrical stub shaft is configured to fit through a shaft opening of the manifold selector disc.

27. The oral health device of claim 1, wherein the fluid delivery system includes a fluid reservoir and a handle, wherein the fluid reservoir includes the fluid and is coupled to the handle, wherein the handle includes the manifold switching mechanism.

* * * * *